K. EISELE.
REINFORCED GLASS PLATE.
APPLICATION FILED NOV. 18, 1911.
1,049,065.
Patented Dec. 31, 1912.
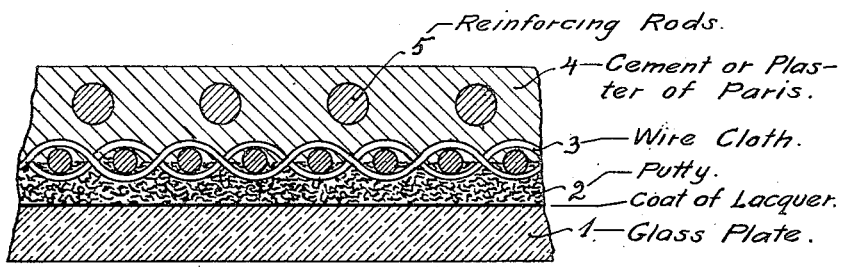

UNITED STATES PATENT OFFICE.

KARL EISELE, OF RASTATT, GERMANY, ASSIGNOR TO ADOLF SCHOMBURG, OF SCHÖNEBERG, NEAR BERLIN, GERMANY.

REINFORCED GLASS PLATE.

1,049,065.        Specification of Letters Patent.        Patented Dec. 31, 1912.

Application filed November 18, 1911. Serial No. 661,138.

*To all whom it may concern:*

Be it known that I, KARL EISELE, a subject of the Grand Duke of Baden, residing at Rastatt, in the Grand Dukedom of Baden, in the German Empire, have invented certain new and useful Improvements in Reinforced Glass Plates; and I do hereby declare the following to be a full, clear, and exact description of the invention, such as will enable others skilled in the art to which it appertains to make and use the same.

The invention relates to a glass plate for signs or showcards, with inscriptions or pictures on them, as used to form screens for façades or for similar purposes. Glass plates of that description have hitherto been made by putting the inscription or picture on the back of the glass and then coating it over with lacquer; but experience has shown that this lacquer is not sufficient to protect the coating on the back of the glass against damage, while it affords the glass plate itself no sufficient protection against breakage.

This invention is intended to get over those disadvantages.

In order that my invention may be properly understood and readily carried into effect, I have hereunto appended a drawing illustrating my invention.

The drawing shows a section through one of the reinforced glass plates.

The inscription or decoration is put upon the clean side of the glass plate 1 in the usual way, and it may be covered over with a coat of lacquer. It is advisable to use for the purpose a lacquer which does not give a smooth surface, but one as rough as possible. Then a layer of putty is spread close and firmly over the decorative coating or the lacquer that covers it, and it is worked in in such a way that it adheres thoroughly all over that coating. On that soft and yielding layer of putty 2, which absolutely does not require to be smooth and even, a piece of wirecloth 3, a sheet of metal with many perforations, or something of the same nature is then placed, so that the wirecloth penetrates partly into layer of putty, but partly remains projecting above it. To give it a better hold on to the putty the wirecloth may have projecting sharp edges or points on it. On this layer of putty 2, over which the wirecloth 3 has been spread, the strengthening layer properly so called 4, consisting of cement, plaster of Paris or similar material, is then spread. A layer of this last mentioned sort adheres to the putty with extreme firmness and the wirecloth lying between contributes to that end. The wirecloth therefore forms not only a connection between the cement and the putty or the glass plate itself, with which latter the layer of putty 2 forms the union, but at the same time it serves for strengthening the cement. When the glass plate has a large surface, it is advisable in addition to embed strong iron wires or iron rods in the cement, or otherwise a perforated plate or a piece of stout wirecloth 5, in order to stiffen that layer without producing too great thickness.

Having now particularly described and ascertained the nature of my said invention and in what manner the same is to be performed, I declare that what I claim is:—

1. A compound plate for signs, showcards, screens or the like comprising a glass plate covered with lacquer, a layer of soft putty adhering to the lacquered glass, a wire-cloth partly contained in said putty but projecting from the face thereof and a layer of a hard but not easily adhesive material held to the putty layer by the roughened wire-cloth surface, substantially as described.

2. A compound plate for signs, showcards, screens or the like comprising a glass plate covered with lacquer, a layer of soft putty adhering to the lacquered glass, a wire-cloth partly contained in said putty, a layer of a hard but not easily adhering material placed over said wire cloth, and iron rods reinforcing said last layer, substantially as described.

In testimony whereof, I have affixed my signature, in presence of two witnesses.

KARL EISELE.

Witnesses:
   AUGUST OOSTERMAN,
   CLARA SCHUTT.